April 9, 1963 W. K. ZELL 3,084,813
TRAILER COURT

Filed Dec. 2, 1960 3 Sheets-Sheet 1

INVENTOR.
Walter K. Zell
BY
Townsend and Townsend
attorneys

April 9, 1963  W. K. ZELL  3,084,813
TRAILER COURT
Filed Dec. 2, 1960  3 Sheets-Sheet 2
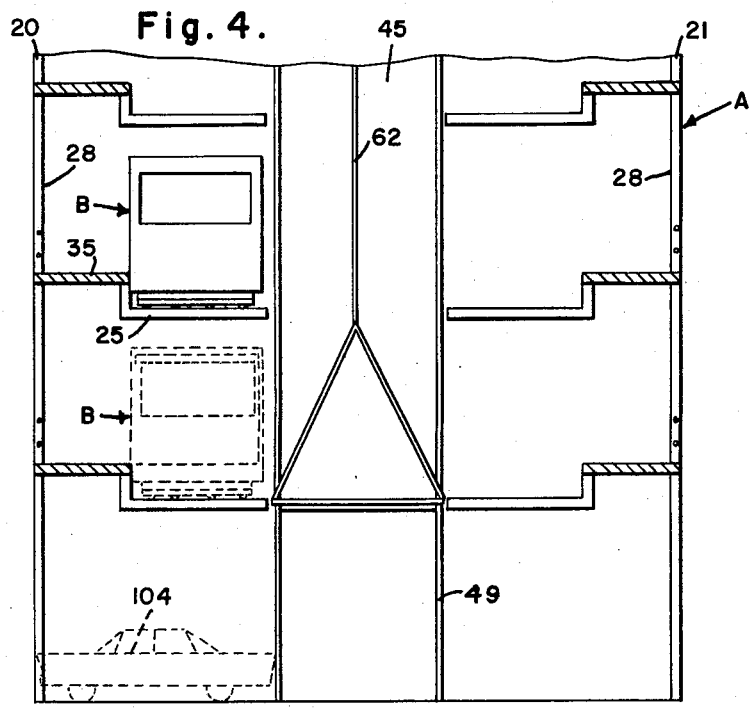
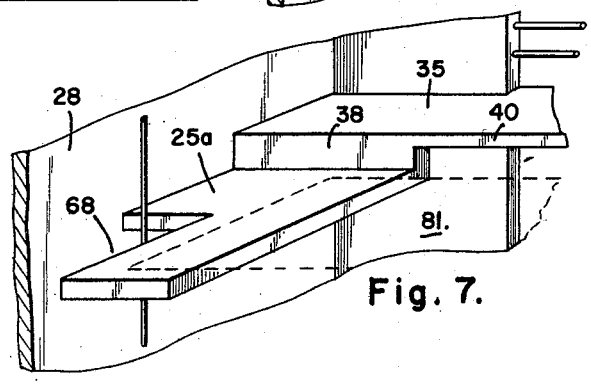
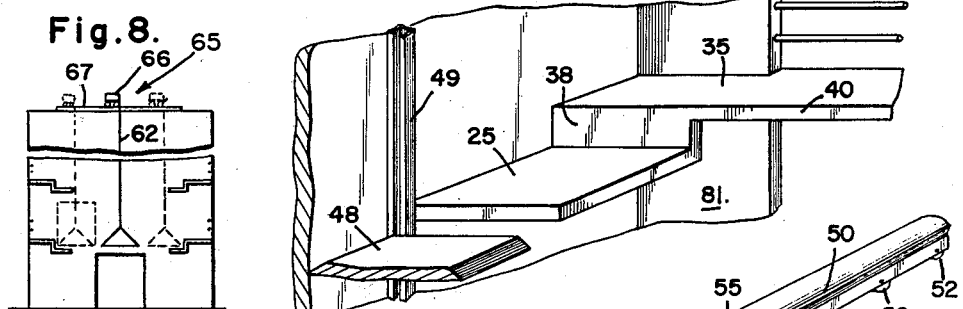
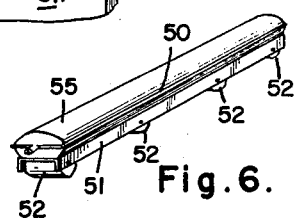
INVENTOR.
Walter K. Zell
BY

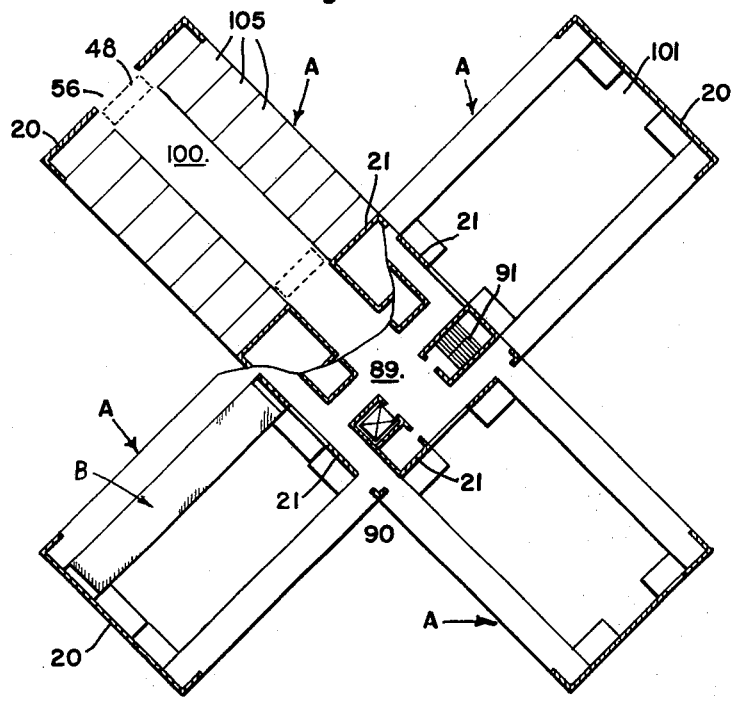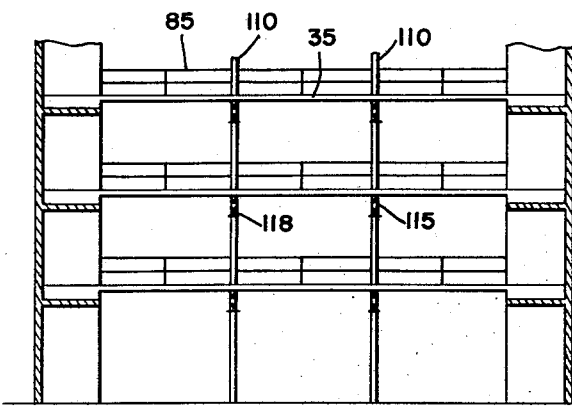

United States Patent Office 3,084,813
Patented Apr. 9, 1963

3,084,813
TRAILER COURT
Walter K. Zell, 1472 Filbert St., San Francisco, Calif.
Filed Dec. 2, 1960, Ser. No. 73,309
4 Claims. (Cl. 214—16.1)

This invention relates to a new building structure for carrying a plurality of trailers in substantially stacked relationship.

In recent years the development of trailers, commonly called mobile homes, has been such that units in length of 40 to 60 feet have been constructed having interiors comparable to the interiors of small apartments and duplex units. The living habits of those persons using such mobile homes or trailers is such that they infrequently move the units from location to location and permanently live in the units at a particular location for substantial periods of time. Because of this condition many elaborate trailer courts have been constructed throughout the nation. Such courts occupy a huge amount of acreage and have such facilities as game rooms, restaurants, service stations and swimming pools available for the use of the occupants of the court. Usually trailer court owners will even rent or lease the space in such courts for prolonged periods of time usually for a period of several months to possibly many years. The courts therefore take on the living characteristics generally similar to the conventional apartment or multiple living units even though each of the individual housing units is independently owned by its occupants and capable of being moved to another location.

One of the principal disadvantages of the present type of trailer court system lies in the fact that a huge amount of land is required. In the heavily populated areas the availability of such large acreages in a location which is convenient to industrial, recreational and business areas are extremely difficult, if not impossible, to find. The unavailability of land requires that some other approach be used to house the large number of mobile homes that are rapidly finding their way into actuality.

The principal object of this invention is to provide a novel building structure which will carry trailers or mobile home units in stacked relationship in a manner similar to the structure of a conventional apartment house.

The objects of this invention are accomplished by providing a skeleton type of building structure in which primary support of the buildings are spaced a distance substantially equal to the length of the trailer. The primary supports are arranged to support the trailer from opposite ends. Thus the trailer itself forms a bridge between two supporting walls. In association with the building structure there is provided elevator and permanent recreational facilities thus rendering a total structure analogous in convenience and appearance to a conventional apartment house.

Another principal object of this invention is to provide a novel trailer housing unit carrying two main spaced apart standards between which opposite ends of the trailer are supported and in which two trailers can be mounted in spaced apart parallel relationship with the further provision of providing elevator means between the spaced apart trailer mounting positions of the building structure. The elevator means thus allows a trailer to be hoisted to a mounting position whereafter it can be laterally moved to the mounting position for permanent support.

A feature and advantage of this invention is the provision of balcony areas immediately adjacent the door of the trailer to provide outdoor facilities at each of the elevations.

Another object of this invention is to provide a novel hoist in which a trailer is supported from two opposite ends by the hoist and to provide platforms supporting the trailer which allow the hoist to move the trailer transversely into supporting position on the platform.

Another embodiment of the invention includes an elevator type of hoist with provisions for transversely moving the trailer from the elevator system to the support or platform.

A feature and advantage of this invention is that the building structure merely need comprise the spaced apart walls with a plurality of vertically aligned platforms. Each of the platforms is thus arranged to carry the end load of a trailer so that the trailer forms the bridge between the platforms with the further provision of a balcony area extending between the main wall sections in relative alignment with the trailer thus providing a balcony area immediately adjacent the trailer.

A further feature of the balcony area is that it provides additional living space immediately adjacent the trailer which may be partially or completely enclosed to form a cabana if desired.

It is another object of this invention to provide supplementary supports by virtue of columns extending from the ground and jacks which assist in supporting the midsection of the trailer. This improvement is useful for some trailers in which the end to end structure of the trailer is not adequate to permanently maintain the support for the structure.

Another feature and advantage of this invention is that the structure lends itself to modular unitized architecture in which each of the individual modules includes a pair of stacked trailers separated by an elevator area. The trailers in each of the pairs are in vertical alignment. The modules can therefore be constructed in inline or in right angled relationship to provide integrated architectural layouts.

Still another feature and advantage of this invention is that the building structure is amenable to carry the necessary electrical, gas and water conduits as well as sewerage facilities so that the complete plumbing and electrical supply to each of the trailers can be carried immediately adjacent or within the walls of the structure.

Other objects of the present invention will become apparent upon reading the following specification and referring to the accompanying drawings in which similar characters of reference represent corresponding parts in each of the several views.

In the drawings:

FIG. 4 is a cross-sectional view similar to FIG. 3.

FIG. 5 is a still further enlarged fragmentary view showing the details of the building structure embodying an elevator type lift.

FIG. 6 is a view of a transverse moving device suitable for use with the elevator of FIG. 5.

FIG. 7 is a perspective view showing the portion of the building structure similar to FIG. 5 but incorporating a trailer support platform adapted to be used with a hoist type of lift.

FIG. 8 is a schematic view showing the operation of the hoist type lift.

FIG. 9 is a top plan view of an X-shaped structure formed by joining four of the modular units together.

FIG. 10 is a fragmentary side elevation showing an embodiment of the invention employing supports for the central portion of trailers carried by the building structure.

FIG. 11 is an enlarged perspective view showing a jack structure for engaging the bottom portion of the midsection of the trailers for support thereunder.

Figure 1:
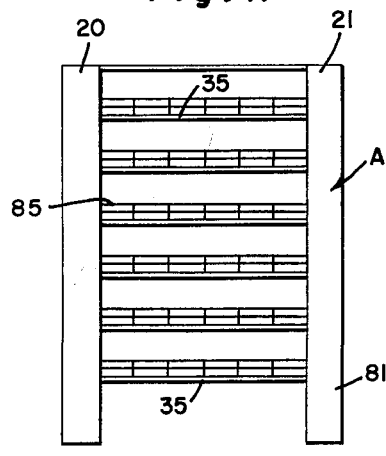
FIG. 1 is a schematic view showing the basic module of the trailer housing structure from side plan.

In the subject invention a trailer supporting module or unit generally indicated at A is formed by two spaced apart vertical parallel walls 20 and 21. The walls are constructed using standard structural techniques to maintain vertical rigidity.

Trailer supporting unit A is arranged to support house trailers B in a relationship in which the house trailers are arranged in two spaced apart vertical columns with the spacing between each of the columns of trailers being sufficient to provide an elevator area in which the trailers can be lifted to or lowered from their mounting position within the building structure.

Each trailer B is arranged to be supported by a platform 25 which extends inwardly from inside faces 28 of the two walls 20 and 21.

Platforms 25 are rigidly mounted on inside faces 28 with sufficient architectural supports to support the load of a trailer supported thereon.

In this building structure platforms 25 extend inwardly a sufficient distance to form a ledge support for the ends 30 of the trailer so that the body of the trailer forms its own bridge between the two ledges or platforms 25. Each one of a pair of platforms 25 is, of course, mounted in coplanar horizontal alignment in order to support the trailer in horizontal position within the building structure.

A porchlike platform 35 is mounted slightly above each of the pairs of platforms 25 which is mounted on and extends between the two walls 20 and 21. Porch 35 is positioned sufficiently above platforms 25 so that the top face of the porch will be at approximately threshold level of doors 36 of trailers supported by platforms 25.

A vertical wall extension 38 depends from porch 35 to platform 25. The inside edge 40 and wall 38 provide a stop which prevents outboard movement of the trailer as will be hereinafter described.

Trailers B are arranged to be supported on opposite sides of an elevator column generally indicated at 45. The elevator column is arranged to carry an elevator hoist mechanism by which trailers B can be lifted to a position in alignment with the respective platforms 25 and therefrom be moved to the right or left for support on the appropriate platforms 25.

In FIG. 5 the fragmentary portion of an elevator mechanism is shown incorporating a movable platform 48 which is arranged to be vertically moved within a track or guide 49. Platform 48 is lifted by any of the conventional lift mechanisms and is arranged with two simultaneously moving platforms on opposite ends of the trailer.

In the device of FIG. 5 a transverse moving roller mechanism 50, as shown in FIG. 6, is mounted under the forward and rear end of the trailer. The mechanism includes a column 51 which carries a plurality of rollers 52. The top portion of roller mechanism 50 is provided with a pneumatic inflatable cylinder 55. The purpose of the cylinder is to allow the trailer to be raised or lowered by the introduction or release of air pressure.

Figure 2:
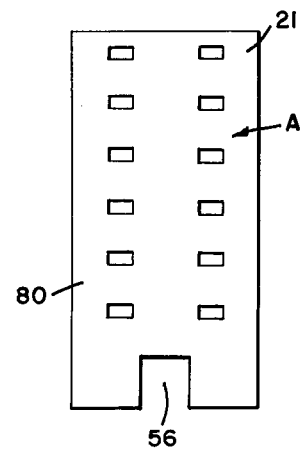
FIG. 2 shows the structure of FIG. 1 from end plan.

In operation a trailer is driven into the building structure through the door opening as indicated in FIG. 2 at 56. In this position the front and rear of the trailer is positioned over a platform 48 of the elevator. Mechanism 50 is mounted on platform 48 under the front and rear portion of the trailer. Inflated cylinder 55 is inflated with air to supporting position with the underside of the trailer. Elevator platform 48 is then moved to a height where the top of the platform is coplanar with a pair of platforms 25. The trailer is then pushed laterally on rollers 52 onto platform 25 and against the inner edge 40 and depending wall 38 forming porch 35. The aforesaid walls 38 and inner edge 40 provide a stop to prevent further outboard movement of the trailer.

Jacks 60 are mounted under the trailer to provide permanent support for the trailer. Air is released from cylinder 55 and mechanism 50 is removed from supporting engagement with the trailer for subsequent use.

In FIGS. 4, 7 and 8 there is provided an ultimate embodiment of the elevator system of the invention in which the elevator is shown to be of a hoist type configuration. In such a type lift, as shown in FIG. 7, the trailer supporting platform is shown at 25$^a$ having a cut-out portion between inside face 28 of the end supporting wall and the main face of the platform to provide an area to allow cables 62 of the hoist to carry trailers onto loading position on platforms 25$^a$.

The hoist mechanism generally indicated at 65 comprises a motor or power mechanism 66 mounted on a track 67 for transverse movement across the top of the building structure. Cable 62 is arranged to engage the ends of trailers at a point midway between the two outer edges in a triangular support arrangement.

In operation a trailer is driven into elevator column 45. Cables 62 are connected by conventional means to the opposite ends of the trailer whereinafter the trailer is lifted by motor mechanism 66 to a position where the bottom of the trailer is slightly above a mating pair of platforms 25$^a$. Motor mechanism 66 is then moved transversely on track 67 to position the trailer over the platform 25$^a$. The cut-out, generally indicated at 68, formed in platform 25$^a$ provides space for the cable to move transversely past the upper platforms. The hoist is then lowered to position the trailer on platform 25$^a$ for permanent mounting. Removal of the trailer, of course, is accomplished by reversing the process.

The wall structure of walls 20 and 21 is generally of a modified U-shaped construction having a main web portion 80 and two inwardly directed legs 81. The inwardly directed legs 81 add structural rigidity to the walls. It is, of course, obvious that other forms or configurations having sufficient strong structural characteristics may equally well be used.

Porches 35 are provided with railings 85 extending between the inner extension of legs 81 of the end walls to provide for the safety of the occupants of the trailers.

Figure 3:
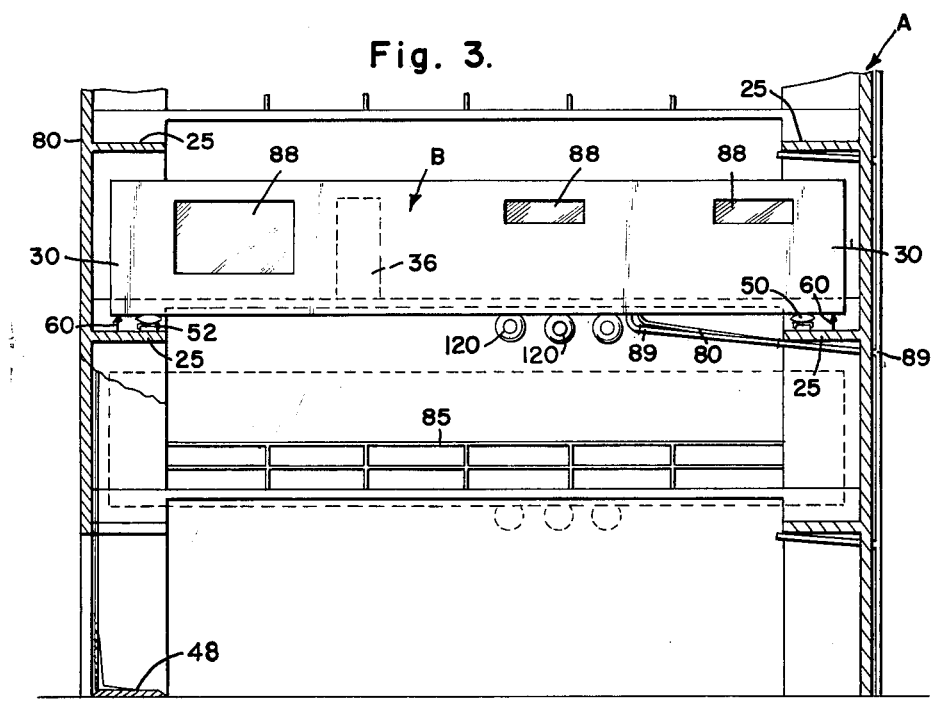
FIG. 3 is a fragmentary enlarged view partially in cross-section showing the side plan of the building structure with a trailer mounted therein.

Various plumbing lines are mounted either in or directly on the wall face to carry electricity, gas, water and to eliminate waste. These lines are indicated at 89 in FIG. 3.

It is, of course, obvious that elevators and stairs are to be constructed adjacent each elevation so that the occupants of the trailers can have ready access to and from their trailers.

Porch 35 can also be enclosed in order to form a cabana and to increase the effective enclosed living area for the occupants of the trailer.

It is important to note that in this structure the two trailers at each elevation are positioned so that their doors 36 and primary view windows 88 are facing outboard toward the porch area where the building module affords an unobstructed view and access to air and light.

The space between the trailers at each elevation affords the elevator shaft for raising and lowering the trailers to their respective elevations.

In FIG. 9 a group of four modules A are mounted in an X type of building structure. The end walls 21 are in edge to edge abutment to form a rectangular columnar area from which the respective modules extend outwardly in a substantially X-shaped configuration. The columnar area 87 affords ample space to carry elevator shafts, as indicated at 90, stairs, as indicated at 91, and recreational room areas as required. Laundry rooms and other conveniences can also be constructed within this area.

The bottom floor is provided with two through accesses generally indicated at 100 and 101 opening at the respective doors 56 in each of the walls 20 and 21. This enables a trailer to be driven through one of the openings 56 straight through the structure and out the other end through the opposite opening 56. This is an important convenience where land access requirements allow only limited access to the structure.

The area on the bottom floor can be stalled off to provide parking facilities for automobiles as indicated at 104.

It is also believed obvious that the module units A can be mounted in an inline row in end to end relationship so that elevator shaft areas 55 are in communication through and between each of the modules thus allowing a trailer to be driven through the modules to the respective module for lifting to the respective elevations.

Normally the structure of trailers is such that end supports of the trailer are sufficient to provide complete structural support so that the trailer provides a unitized bridge structure between the platforms. It may be desirable in some cases, however, to provide additional stabilizing supports intermediate the two ends of the trailer. This can be provided, as shown in FIGS. 10 and 11, by providing a pair of columns 110 having vertical supports which function to support the mid-section of porch 35. Columns 110 have inwardly projecting arms 115 which are aligned under trailers carried between the two platforms 25. The arms carry jacks 118 which are arranged to engage the bottom of the trailer for stabilizing support. It is important to note that in this invention that the wheels 120 of the trailer may be either alternatively left on the trailer or may be removed from the trailer prior to being installed at the respective elevation. The building structure is suitable for maintaining trailers in either condition.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A building structure for carrying a plurality of mobile home units comprising two spaced apart parallel vertical walls, mobile home unit support means mounted on the inside face of said walls adapted to support a plurality of mobile home units in two parallel vertical rows, said mobile home unit support means being mounted on the inside face of each wall and engaging the bottom edge only of said mobile home units, porch means mounted between each of said walls in elevational alignment with the door threshold of mobile home units when mounted on said mobile home unit support means, an elevator shaft area between each of the rows of mobile home unit support means, elevator means in said elevator shaft area to lift mobile homes to elevations coincident with each of said mobile home unit support means, and means for transversely moving mobile home units from the elevator shaft area to supporting alignment with the mobile home unit support means.

2. A device according to claim 1 and wherein said elevator means comprises a pair of spaced apart platforms and means for moving said platforms to elevational alignment with said mobile home unit support means, and said transverse moving means comprises a roller mechanism mounted between the bottom of the trailer and the elevator platform to allow the transverse movement of said mobile home unit from said elevator to said support means.

3. A building structure for carrying a plurality of mobile home units comprising two spaced apart parallel vertical walls, mobile home unit support means mounted on the inside face of said walls adapted to support a plurality of mobile home units in two parallel vertical rows, said mobile home unit support means being mounted on the inside face of each wall and engaging the bottom edge only of said mobile home units, an elevator shaft area between each of the rows of mobile home unit support means, elevator means in said elevator shaft area to lift mobile homes to elevations coincident with each of said mobile home unit support means, means for transversely moving mobile home units from the elevator shaft area to supporting alignment with the mobile home unit support means, and floor means disposed between said vertiwalls remote from said elevator shaft and supported by at least one said wall.

4. A building structure for removably receiving a plurality of mobile home units at elevated positions therein comprising a pair of vertical wall structures, a plurality of pairs of elevated platforms carried by said structures, the platforms of each pair of structures being spaced apart so as to extend under and form end supports for the underside of a mobile home unit, said pairs of platforms being mounted on said vertical wall structures in two spaced apart vertical columns, elevator means for carrying mobile home units to elevated positions between the two columns of pairs of elevated platforms, floor means carried by said vertical wall structures on a side of the mobile unit opposite the elevator means to permit ingress and egress from a said mobile unit, and means to move said mobile home units from said elevator means to supporting relationship on top of each pair of elevated platforms.

References Cited in the file of this patent

UNITED STATES PATENTS

| | | |
|---|---|---|
| 1,605,220 | Cuvillier et al. | Nov. 2, 1926 |
| 2,499,498 | Hammond | Mar. 7, 1950 |